Patented Feb. 2, 1954

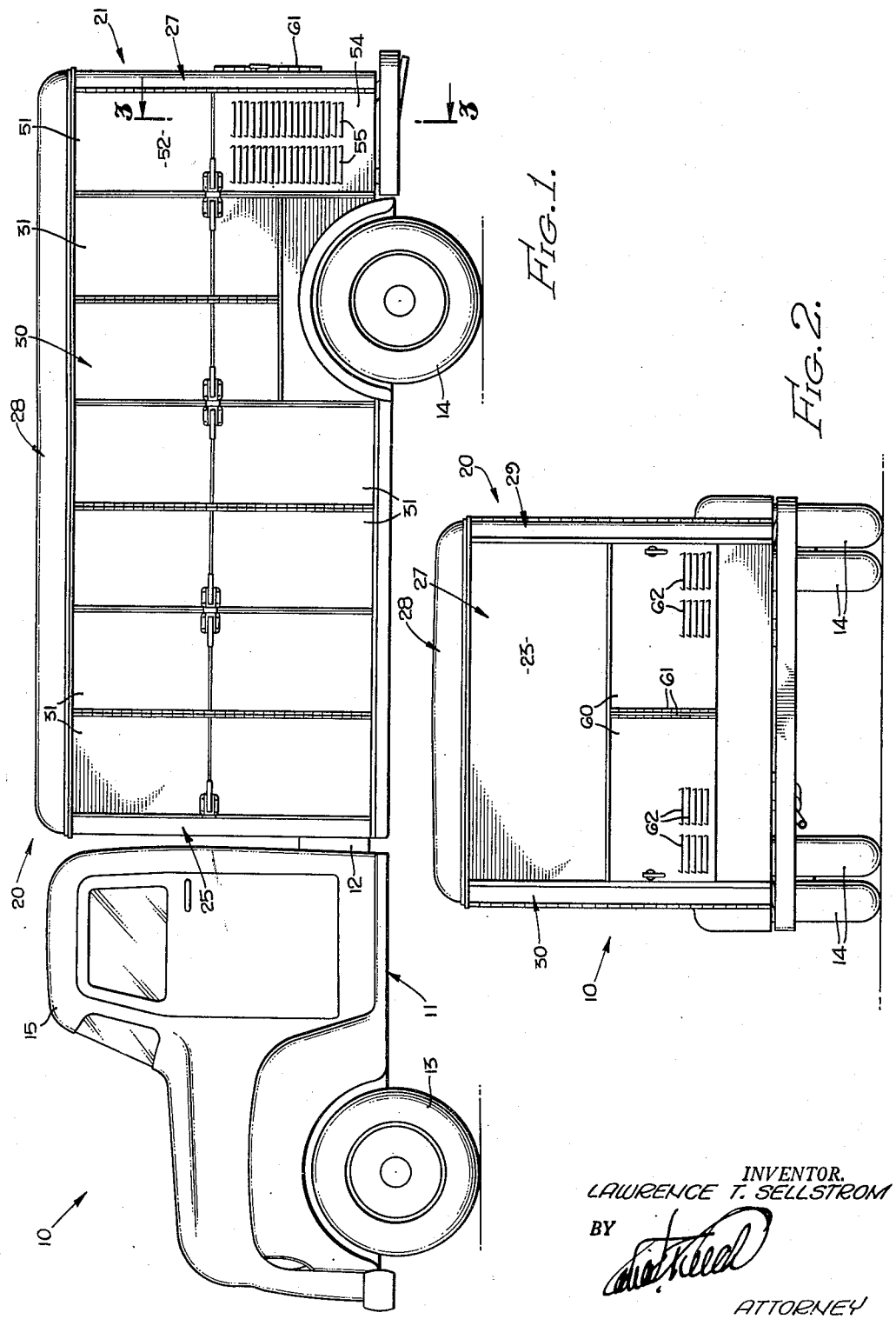

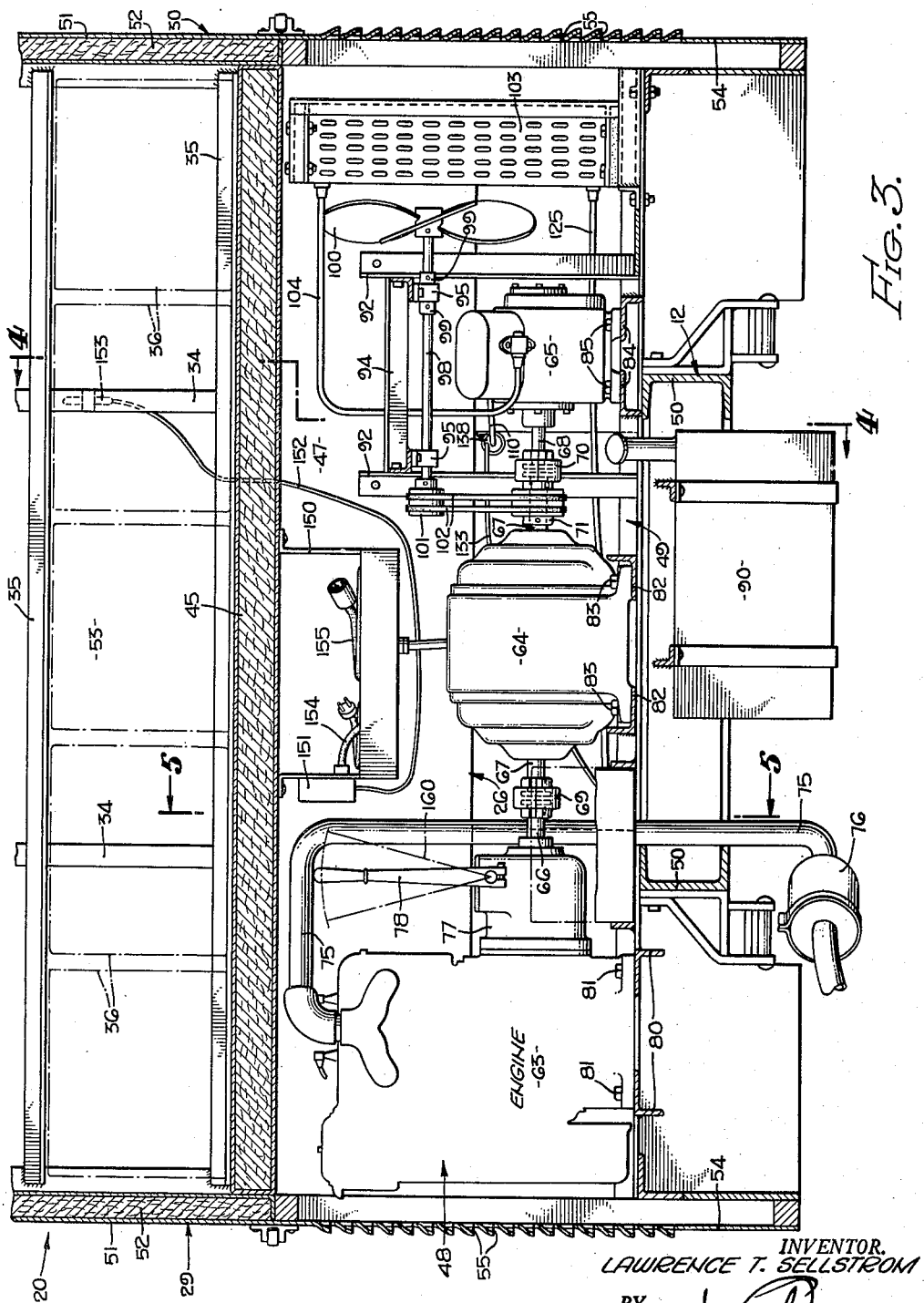

2,667,761

UNITED STATES PATENT OFFICE 2,667,761

HIGHWAY TRUCK WITH SELF-CONTAINED REFRIGERATION SYSTEMS

Lawrence T. Sellstrom, Los Angeles, Calif., assignor to Knudsen Creamery Co. of California, Los Angeles, Calif., a corporation of California Application November 3, 1951, Serial No. 254,674

6 Claims. (Cl. 62—117)

1

This invention relates to refrigerated highway trucks and particularly to a highway truck embodying a self-contained refrigeration unit therein.

The problem to the solution of which the present invention was directed involves the refrigeration of a particular type of refrigerated truck body to which all standard refrigerating units are, for one reason or another, inapplicable. The truck body in question is of the type formerly refrigerated by ice carried in troughs just within in opposite sides of the body and is relatively low, being only slightly higher than the driver's cabin and which has no place on the exterior of the body on which a refrigeration unit might be practically applied. This type of body carries a series of narrow full-height doors opening from opposite sides of the truck body throughout the length of the latter so that access may be had through a corresponding opposite pair of said doors to the boxes or bottle cases contained in each of a series of transverse compartments into which said body is divided.

The objects of the invention embrace the provision of a self-contained refrigeration system for such a truck which would not increase the width, height or length of the body; one which would weigh substantially less than the amount of ice previously recited for the refrigeration of said body; a system which would keep all sections of the body cold thereby eliminating hot spots; that would provide adequate refrigeration to keep the products in the truck body at approximately 40° F. twenty-four hours each day; which must be operable under its own power while said truck is travelling and be operable when said truck is stored at night by connection with any standard electric service outlet; and that will not represent either a nuisance or a safety hazard to the general public or to the truck operator.

The manner of accomplishing the foregoing objects as well as further objects and advantages will be made manifest in the accompanying drawings in which Fig. 1 is a diagrammatic, side elevational view of a preferred embodiment of the invention.

Fig. 2 is a rear elevational view of Fig. 1.

Fig. 3 is an enlarged transverse fragmentary sectional view taken on the line 3—3 of Fig. 1 and illustrating the self-contained refrigeration unit of the invention.

2

Figure 6:
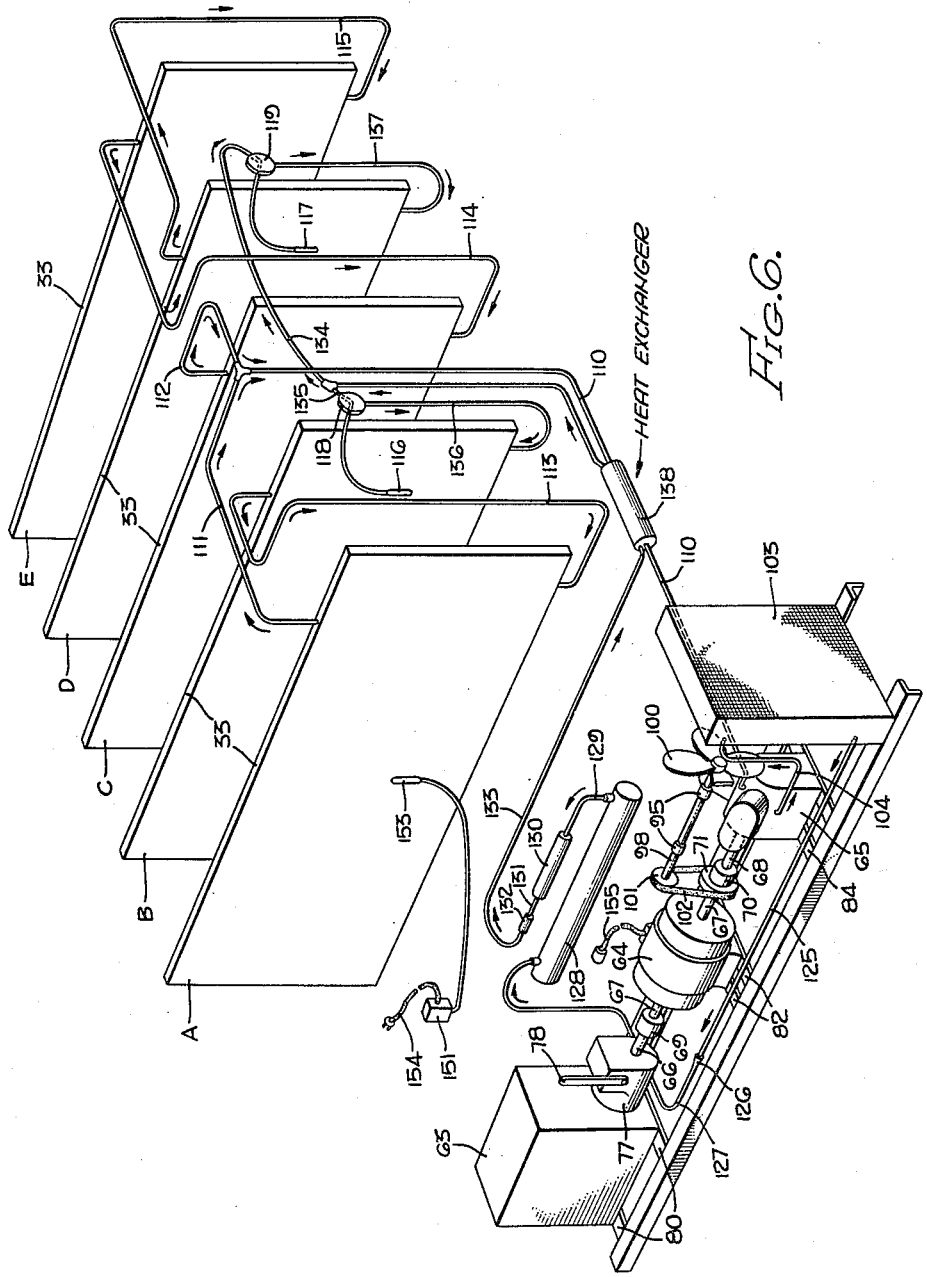

Fig. 6 is a diagrammatic perspective view illustrating the refrigeration system of the invention.

Figure 4:
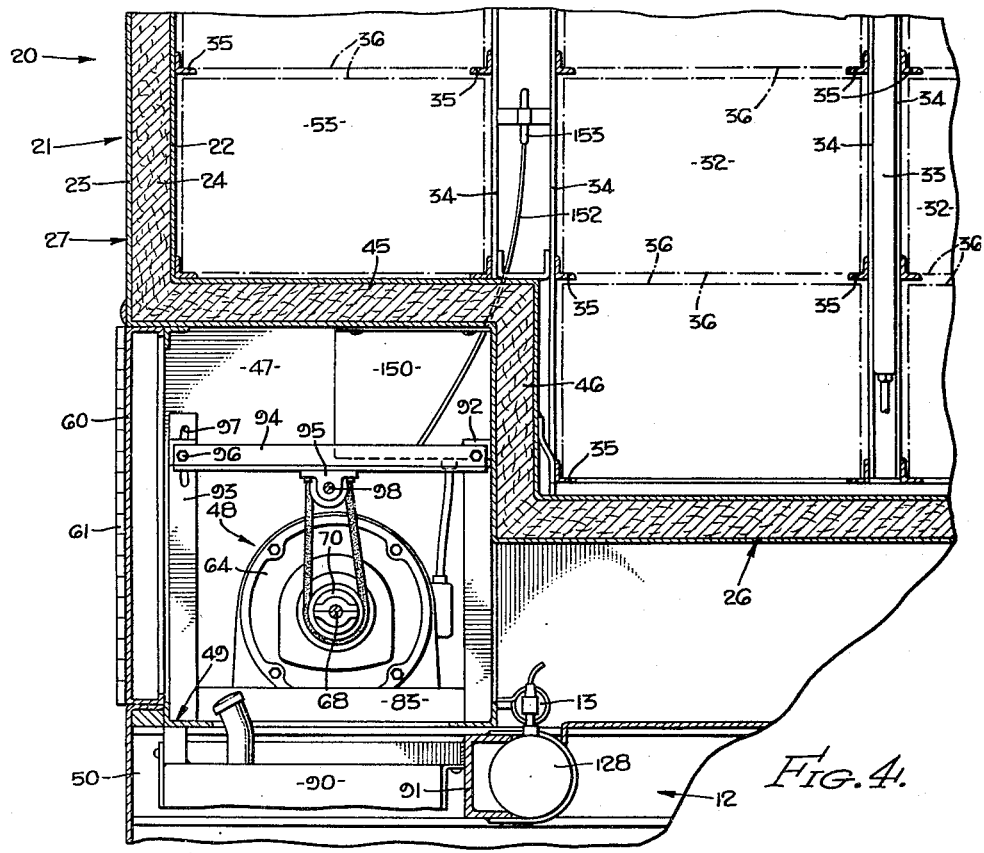
Fig. 4 is a fragmentary vertical sectional view taken on the line 4—4 of Fig. 3.

Referring specifically to the drawings and particularly to Figs. 1 and 2, the invention is there shown as preferably embodied in a highway truck 10 having an automotive chassis 11 including a frame 12 mounted on front wheels 13 and rear drive wheels 14 and having a driver's cabin 15 for accommodating the driver of the truck. The truck 10 also includes a cold box 20 all the walls 21 of which are formed of spaced sheets of metal 22 and 23, the space between which is filled with heat insulating material 24 (Fig. 4). The walls 21 of box 20 include a front wall 25 (Fig. 1), a bottom wall 26 (Fig. 4), a rear wall 27, a top wall 28 and side walls 29 and 30.

The side walls 29 and 30 are formed by a series of narrow, full-height doors 31 which are hingedly mounted back to back along adjacent vertical edges to close closely spaced vertical door openings formed in the side walls 29 and 30. The door openings thus formed in side walls 29 are directly opposite corresponding door openings in side wall 30, thereby providing ready access separately to either end of each of a series of transverse compartments 32 into which the interior of cold box 20 is divided by a series of cold plates 33 (Fig. 4) which are supported by vertical bars 34 and horizontal pairs of angle irons 35 which act as supporting rails for boxes 36 of uniform size in which the product is packed for conveniently loading the same into and removing it from the truck 10.

In order to accommodate the axle structure on which the rear drive wheels 14 are mounted, the bottom wall 26 is higher, by approximately the height of a single box 36, in the two compartments 32 disposed over wheels 14. This causes the doors 31 for these two compartments to be correspondingly shorter than the other doors 31.

The lower edge of rear wall 27 connects with a short horizontal wall 45 the inner edge of which is joined by a short vertical wall 46 to the rear edge of bottom wall 26 (Fig. 4). An insulated transverse recess 47 is thus formed which extends entirely across the rear lower corner of the cold box 20 for the reception of a refrigerant compressing unit 48. The unit 48 is mounted on a structural steel frame 49 which extends across and is fixed upon longitudinal channel members 50 of the chassis frame 12 (Fig. 3).

The rearmost doors 51 (of the side doors 31) have upper portions 52 thereof of double-walled insulation-filled structure (Fig. 3) where these upper portions lie opposite and close opposite ends of transverse compartment 53 (of the compartments 32) which lies just above the horizontal wall 45. Lower portions of the doors 51 are formed of sheet metal 54 having louvres 55 which sheet metal lies in the planes of the outer faces of cold box side walls 29 and 30 and permits the passage of air into and from the recess 47 in which the unit 48 is mounted.

Figure 5:
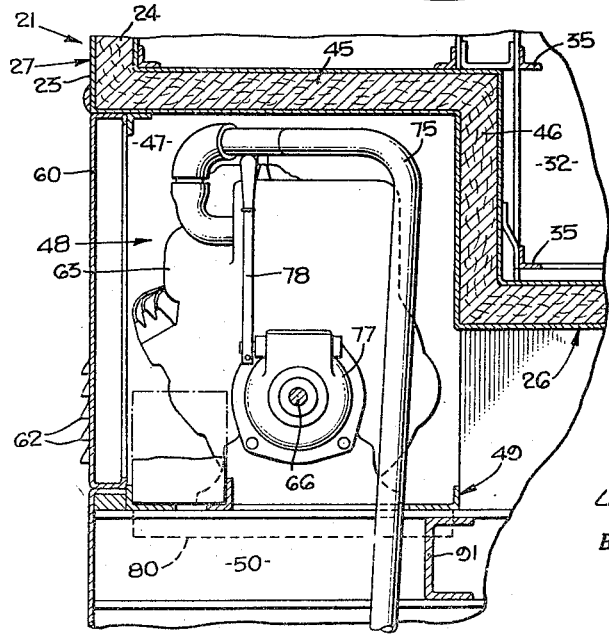
Fig. 5 is a fragmentary vertical sectional view taken on the line 5—5 of Fig. 3.

The housing for recess 47 also includes rear doors 60 which are pivotally mounted, edge-to-edge, on hinges 61 and have louvers 62 to aid in ventilating the recess 47. The doors 60 lie flush with the outer sheet metal plates 23 of the cold box end wall 27 (Figs. 4 and 5).

The refrigerant compressing unit 48 includes an internal combustion engine 63, an electric motor 64 and a refrigerant compressor 65, these elements being mounted on the frame 49 with their shafts 66, 67 and 68, respectively, in coaxial alignment, with the shafts 66 and 67 connected by a drive coupling 69; and with shafts 67 and 68 connected by a drive coupling 70. Between the motor 64 and the coupling 70 a double pulley 71 is fixed on the shaft 67. The exhaust from the engine 63 is conducted through a pipe 75 downwardly to a muffler 76 from which it is discharged. The shaft 66 of engine 63 connects with the crank shaft of the latter through a clutch 77 which is controlled by a lever 78 to connect or disconnect the engine 63 with shaft 66 at will.

The structural steel frame 49 includes a pair of angle iron cross members 80 on which the engine 63 is mounted by cap screw 81. The frame 49 also includes a pair of angle iron cross members 82 on which the motor 64 is secured by cap screws 83. Frame 49 also includes a pair of angle iron cross members 84 on which the compressor 65 is fastened by cap screws 85.

A fuel tank 90 for the engine 63 is suspended from the frame 49 and a channel beam 91 connecting frame channels 50.

Extending upwardly from one side of the frame 49 are two posts 92, and, from the opposite side of the frame, corresponding posts 93. Pivoted on the upper ends of posts 92 is a rectangular bearing support 94 carrying bearings 95, said support being adjustably connected at its other side with the posts 93 by bolts 96 extending through slots 97 in said posts. Journalled in bearings 95 is a shaft 98 which is held against axial movement by collars 99 and has fastened on the outer end thereof an air fan 100 and on the opposite end thereof a double grooved pulley 101 which is connected with pulley 71 by endless belts 102. The blades of the fan 100 are pitched so that when rotated in the normal operation of the compressor unit 48 air will be blown from the right towards the left over the compressor 65 (Fig. 3).

Mounted on the frame 49 of the unit 48 at the extreme right end thereof close to the fan 100 is a condenser 103, the upper end of which is connected by flexible tube 104 with the discharge side of compressor 65. The intake side of compressor 65 connects through a flexible tube 110 and branch tubes 111 and 112 with the upper edges of cold plates 33 which are identified as cold plates A and C out of a series A, B, C, D and E of said cold plates which are embodied in the structure of the cold box 20. The lower edge of cold plate A is connected by tube 113 with the upper edge of cold plate B while the lower edge of cold plate C is connected by a tube 114 with the upper edge of cold plate E. The lower edge of cold plate E is connected by a tube 115 with the upper edge of cold plate D. Cold plates B and D are equipped with thermostatic elements 116 and 117 which are connected to and actuate control valves 118 and 119.

The lower end of the condenser 103 (Fig. 6) is connected by a tube 125, which is preferably about ⅝ in. in diameter, through a reducer 126, and a tube 127 of approximately ⅜ in. in diameter, to a receiver tank 128. The opposite end of receiver 128 is connected by a tube 129 with a dryer 130 which is connected by a tube 131 to a sight glass 132 the latter being connected by a tube 133 having branches 134 and 135 to the valves 118 and 119. When the temperature in the cold box 20 is above a given minimum the thermostatic elements 116 and 117 cause fluid delivered through pipes 134 and 135 to valves 118 and 119 to flow therefrom through pipes 136 and 137, respectively, into the lower ends of cold plats B and D.

Tubes 133 and 110 travel parallel to each other through a heat exchanger 138, the purpose of which will be made clear hereinafter.

Secured to the lower face of the wall 45 (Figs. 3 and 4) is a service cord box 150 on which is mounted a thermo-responsive electric switch 151 which is connected by a tube 152 with a thermostatic element 153 mounted in the dead air space between the rearmost cargo compartment 53 and the compartment 32 adjacent thereto (Fig. 4). The switch 151 is powered by current supplied by a service cord 154 connecting with an ordinary lighting circuit to shut off the motor 64 when the temperature in the box 20 drops below a certain value and to start motor 64 when said temperature rises above a given maximum value.

The motor 64 is adapted to be energized by current supplied thereto by a service cord 155 which is adapted to connect with a three-phase outlet provided in the service station or garage where the truck 10 is parked at night.

*Operation*

The truck 10 is especially adapted for the wholesale delivery of dairy products packed in cases in which a substantial order including a case or more of goods is frequently delivered at each stop. The boxes or cases of dairy products thus transported in the truck 10 rest upon the pairs of rails 35 provided at corresponding levels in all of the compartments 32 as shown in Fig. 4. It has been found economical to keep the interior of the cold box 20 refrigerated to the desired mean temperature of 40° F. throughout its storage at night in a garage so that it will be unnecessary to remove any portion of a load taken out on a previous day's run which remains in the truck upon its return at night. The cold box is thus ready to be reloaded any time during the night with the product to be taken out on the next day's run.

The unit 48 of the present invention may be operated under the control of the thermostatic switch 151 to maintain the desired mean temperature in the cold box 20 merely by plugging the electric service cords 154 and 155 into corresponding outlets provided adjacent the place of night storage of the truck 10. Before doing this, of course, the clutch 77 is disengaged by swinging the lever 78 into its upright position in which it is shown in full lines in Fig. 3, if this lever is not already so positioned.

When thus energized, the motor 64 drives the compressor 65 through the coupling 70 and rotates the fan 100 so as to suck air through the condenser 103 and blow this air over the compressor 65, motor 64 and engine 63. The compressor sucks refrigerant, which may be Freon, through pipes 110, 111 and 112 from the upper ends of cold plates A and C. This refrigerant gas is compressed in the compressor 65 and delivered therefrom through the pipe 104 to the condenser 103 which cools the refrigerant to condense this into a liquid which flows from the lower end of the condenser 103 through pipes 125 and 127 into the storage receiver 128. The refrigerant then flows successively through pipe 129, dryer 130, pipe 131, sight glass 132 and pipes 133, 134 and 135 to the thermostatically controlled valves 118 and 119 from which the refrigerant is released and allowed to flow through pipes 136 and 137 into the lower ends of cold plates B and D, respectively.

From these two points the refrigerant circulates upwardly through the cold plates B and D from the upper ends of which it is transferred to the lower edges of cold plates A and E and from the lower edge of the latter to the upper edge of cold plate C. All of the cold plates A, B, C, D and E are thus refrigerated by the expansion of the refrigerant and the latter is returned through pipes 110, 111 and 112 to the compressor 65.

Before starting from the garage to begin each day's run, the service cords 154 and 155 are disconnected from their respective outlets thereby de-energizing the motor 64, and are stored in the box 153. The engine 63 is now started by an electric starting motor with which it is equipped. The lever 78 is now swung to the right, as indicated by broken lines 160, thereby throwing in the clutch 77. This causes the engine 63 to be connected with the shaft 66 so that the compressor 65 will be driven by said engine through shafts 66, 67 and 68. Because of the higher temperatures prevailing during the day and the losses of refrigeration resulting from the necessarily frequent opening of one or more of the doors 31 in the delivery of product from the truck, it is practically necessary to maintain the unit 48 in operation continuously while the truck is away from its home station. It is thus necessary to keep the engine 63 running throughout the day.

It is to be noted that the motor 64 when de-energized provides a ready transmission of power from the engine 63 to the compressor 65 while still allowing the engine and the compressor to be respectively located at opposite ends of the unit 48 where these are directly adjacent to louvres 55 giving maximum access to the outside atmosphere.

The "in-line" arrangement of the elements of the unit 48 not only permits this unit to occupy a relatively small recess 47 formed in the rear lower corner of the cold box 20 but the coupling of these units together by the couplings 69 and 70 which are readily detachable permit any one of the three elements 63, 64 and 65 of the unit 48 to be removed without disturbing the others, whenever this is necessary for the purpose of repairs or replacement.

While the primary function of the fan 100 is to cool the condenser 103 by drawing through this condenser air entering the recess 47 through the adjacent louvres 55, this fan causes the circulation of air throughout the recess 47 and keeps the temperature of the air in this recess down to within only a few degrees above that of the outside atmosphere.

The claims are:

1. In a refrigerated body for use on a highway truck chassis having a frame and driver's cabin, the combination of: a cold box having thick insulated walls and adapted to rest on and be secured to the frame of said chassis behind the driver's cabin thereof, said cold box being divided by a series of transversely disposed cold plates into a succession of relatively narrow compartments, the side walls of said body comprising two like series of full height narrow doors hingedly mounted on vertical axes along opposite sides of said box, said doors being arranged in opposed pairs, each such pair of opposed doors giving access to opposite ends of one of said compartments, there being an angled recess formed transversely in the rearmost and bottom insulated walls of said box at the lower rear corner of and across the full width of the box; and a self-contained refrigerant compressing unit housed within the space formed by said recess, said unit supplying compressed refrigerant to said cold plates to substantially uniformly refrigerate said compartments.

2. A combination as in claim 1 in which the housing provided for said refrigerant compressing unit includes the box walls lying above and forwardly of said recess, and sheet metal extensions of the vertical rear wall and side walls of said cold box which lie in the planes of the outer surfaces of said rear and side walls.

3. A combination as in claim 2 in which said compressing unit includes a compressor, an internal combustion engine for driving said compressor while said truck is traveling on the highway, an electric motor for driving said compressor while said truck is standing overnight, and a manually operable clutch for positively disconnecting said engine from said compressor while said motor is driving the latter.

4. In a refrigerant compressing unit adapted to be mounted in a single recess formed transversely in a rear lower corner of a refrigerated truck body, the combination of: a compressor; an internal combustion engine; an electric motor; means for mounting said compressor, said motor, and said engine in a line with their shafts in co-axial alignment; means for coupling adjacent ends of said shafts whereby said compressor may be optionally driven by said engine or said motor and said shafts may be readily disconnected to facilitate removal of one of said coupled elements from said unit for repair or replacement; and a manually operable clutch for positively disconnecting said engine from driving relationship with said compressor when it is desired to drive the latter by said motor.

5. In a refrigerant compressing unit adapted to be mounted in a single relatively, long, narrow recess formed transversely in a rear corner of a refrigerated truck body, the combination of: a relatively, long, narrow frame; an internal combustion engine mounted at one end of said frame; a drive clutch embodied with said engine; a shaft extending from said engine which said clutch is adapted to optionally connect with said engine or disconnect therefrom; a refrigerant compressor mounted on the opposite end of said frame, said compressor having a shaft which is disposed in horizontal co-axial alignment with said engine shaft; an electric motor mounted on said frame between said engine and said compressor, said electric motor having a shaft which projects from opposite ends thereof and lies in co-axial alignment with the aforesaid shafts of said engine and said compressor and is spaced a relatively short distance, respectively, from said engine and compressor shafts; drive couplings uniting juxtaposed ends of said engine, compressor and motor shafts; and a lever for manually controlling said clutch to disconnect said engine from said engine shaft when electricity is available for energizing said motor to drive said compressor and for reconnecting said engine with said engine shaft before said motor is de-energized whereby power from said motor may be employed for starting said engine.

6. In a refrigerated body for use on a highway truck chassis having a frame and driver's cabin, the combination of: a cold box having thick insulated walls and adapted to rest on and be secured to the frame of said chassis behind the driver's cabin thereof, said walls including a front wall, a top wall, a rear wall, and a bottom wall; two like series of full-height, narrow, thick, insulated doors hingedly mounted on vertical axes along opposite sides of said cold box so as to substantially comprise the side walls thereof, said doors being arranged in opposed pairs; a series of transversely disposed cold plates mounted within said box in spaced transverse planes dividing the interior of said box into transverse compartments, access to opposite ends of each of which is had by the doors of one of said pairs of doors, there being a recess formed in the rearmost bottom corner of said box and extending across the full width of the box; and a self-contained refrigerant compressing unit housed within the space formed by said recess, said unit including an internal combustion engine located adjacent to one end of said recess, a compressor at the opposite end of said recess, and an electric motor disposed between said engine and said compressor, detachable coupling means coupling said engine compressor and motor on a common operating axis which extends transversely of said cold box, and optionally operable means for disconnecting said engine from said motor, said unit supplying compressed refrigerant to said cold plates to substantially uniformly refrigerate said compartments.

LAWRENCE T. SELLSTROM.

References Cited in the file of this patent
UNITED STATES PATENTS

| Number | Name | Date |
|---|---|---|
| 2,203,406 | Dempsey, Jr. | June 4, 1940 |
| 2,571,445 | Hawkes | Oct. 16, 1951 |
| 2,575,939 | Brouer | Nov. 20, 1951 |